US012145623B2

(12) United States Patent
Winter et al.

(10) Patent No.: US 12,145,623 B2
(45) Date of Patent: Nov. 19, 2024

(54) METHODS AND SYSTEMS FOR PROVIDING INCREMENTAL REMOTE ASSISTANCE TO AN AUTONOMOUS VEHICLE

(71) Applicant: Waymo LLC, Mountain View, CA (US)

(72) Inventors: Collin Winter, San Francisco, CA (US); Vishay Nihalani, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 311 days.

(21) Appl. No.: 17/557,908

(22) Filed: Dec. 21, 2021

(65) Prior Publication Data

US 2023/0192134 A1 Jun. 22, 2023

(51) Int. Cl.
*B60W 60/00* (2020.01)
*G06V 20/56* (2022.01)
*G08G 1/0969* (2006.01)

(52) U.S. Cl.
CPC ......... *B60W 60/0015* (2020.02); *G06V 20/56* (2022.01); *G08G 1/0969* (2013.01);
(Continued)

(58) Field of Classification Search
CPC ......... B60W 60/0015; B60W 2420/42; B60W 2554/4049; G06V 20/56; G08G 1/0969; G05D 2201/0213; G05D 1/0044
See application file for complete search history.

(56) References Cited

U.S. PATENT DOCUMENTS 8,682,575 B2   3/2014  Sakashita
8,688,306 B1*  4/2014  Nemec .................. B60W 50/14
                                                455/457
(Continued)

FOREIGN PATENT DOCUMENTS

CN        107153420 B     1/2021

OTHER PUBLICATIONS

Sawers "Ottopia's remote assistance platform for autonomous cars combines humans with AI", Dec. 21, 2018, https://venturebeat.com/2018/12/21/ottopias-remote-assistance-platform-for-autonomous-cars-combines-humans-with-ai/, retrieved Sep. 29, 2021.
(Continued)

*Primary Examiner* — Jason Holloway
*Assistant Examiner* — Madison B Emmett
(74) *Attorney, Agent, or Firm* — McDonnell Boehnen Hulbert & Berghoff LLP

(57) ABSTRACT

Example embodiments relate to techniques for providing incremental remote assistance to a vehicle. A computing device initially receives location information from a vehicle that is autonomously navigating to a destination. Based on the location information, the computing device displays a representation of an environment of the vehicle and receives a first input specifying a first waypoint and a second input specifying a second waypoint positioned on the representation of the environment. The computing device is configured to limit a location of the first waypoint based on a first location of the vehicle, and a location of the second waypoint based on a second location of the vehicle or the location of the first waypoint. The computing device can then provide route instructions to the vehicle based on at least the first waypoint or the second waypoint.

19 Claims, 12 Drawing Sheets

(52) U.S. Cl.
CPC .............. *B60W 2420/403* (2013.01); *B60W 2554/4049* (2020.02)

(56) References Cited

U.S. PATENT DOCUMENTS

| | | | |
|---|---|---|---|
| 8,849,496 | B2 | 9/2014 | Miyamoto |
| 8,996,224 | B1 | 3/2015 | Herbach |
| 10,338,591 | B2 | 7/2019 | Baalke |
| 10,390,474 | B2 | 8/2019 | Kelley |
| 10,618,673 | B2 | 4/2020 | Chan |
| 10,761,542 | B1 | 9/2020 | Fairfield |
| 11,126,866 | B2 | 9/2021 | Schubert |
| 11,599,951 | B1* | 3/2023 | Gross .................... G09B 19/00 |
| 2011/0130956 | A1* | 6/2011 | Tracton ............. G01C 21/3644 715/764 |
| 2013/0218416 | A1* | 8/2013 | Shirato ................ B60W 10/20 701/42 |
| 2014/0229101 | A1* | 8/2014 | Glaser .................. G01C 21/34 701/538 |
| 2015/0168154 | A1* | 6/2015 | Boerger .............. G01C 21/206 701/410 |
| 2016/0102988 | A1* | 4/2016 | Kalai ................. G01C 21/3881 701/428 |
| 2016/0223342 | A1* | 8/2016 | Vreswyk ............ G01C 21/3896 |
| 2018/0180439 | A1* | 6/2018 | Akhtar ............... G01C 21/3641 |
| 2019/0120654 | A1* | 4/2019 | Todasco ............ G01C 21/3476 |
| 2020/0192351 | A1* | 6/2020 | Rastoll .................. G06V 20/58 |
| 2020/0239023 | A1 | 7/2020 | Srinivasan |
| 2020/0348686 | A1 | 11/2020 | Baloch |
| 2020/0409368 | A1 | 12/2020 | Caldwell |
| 2020/0409386 | A1 | 12/2020 | Thakur |
| 2021/0096568 | A1 | 4/2021 | Kumar |
| 2021/0132604 | A1* | 5/2021 | Gillett ................. G05D 1/0016 |
| 2021/0323404 | A1* | 10/2021 | Kwon .................... B60K 35/00 |
| 2022/0198945 | A1* | 6/2022 | Rey ...................... G08G 5/0056 |
| 2024/0069542 | A1* | 2/2024 | Sredzki ............. G05D 1/228 |
| 2024/0123975 | A1* | 4/2024 | Sridharan ............. B60W 50/14 |

OTHER PUBLICATIONS

Yang et al., "Unmanned Vehicle Path Planning for Unknown Off-road Environments with Sparse Waypoints", https://Ieeexplore.ieee.org/document/8917191, retrieved Sep. 29, 2021.

* cited by examiner

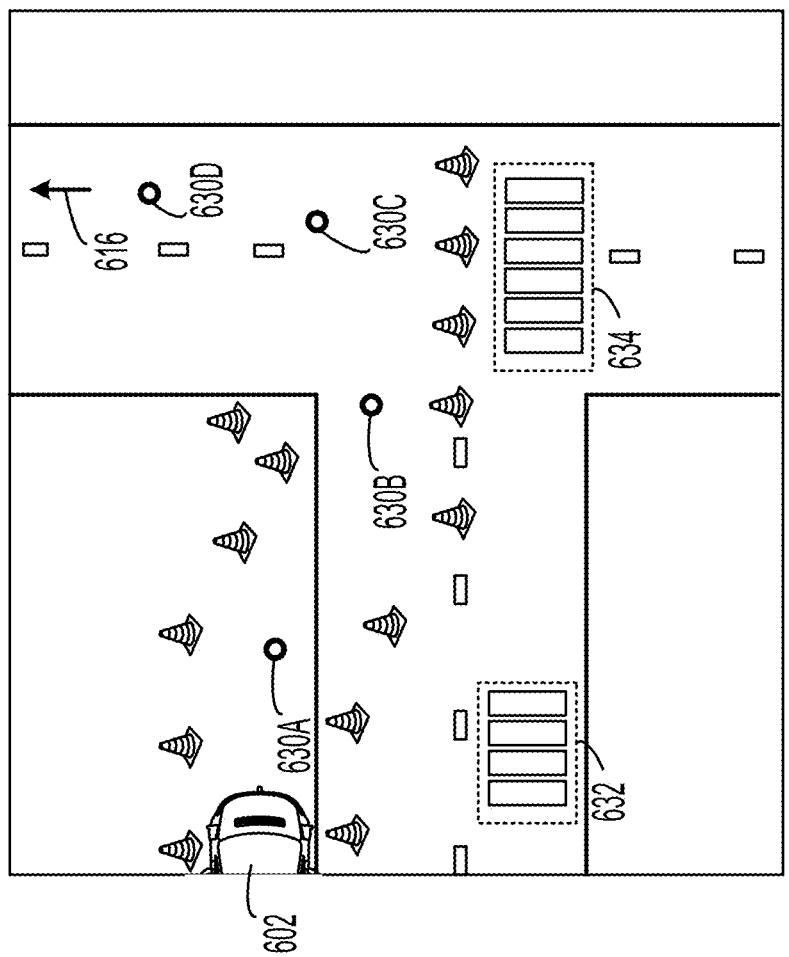

METHODS AND SYSTEMS FOR PROVIDING INCREMENTAL REMOTE ASSISTANCE TO AN AUTONOMOUS VEHICLE

BACKGROUND

Advancements in computing, sensors, and other technologies have enabled vehicles to safely navigate between locations autonomously, i.e., without requiring input from a human driver. By processing sensor measurements of the surrounding environment in near real-time, an autonomous vehicle can safely transport passengers or objects (e.g., cargo) between locations while avoiding obstacles, obeying traffic requirements, and performing other actions that are typically conducted by the driver. Shifting both decision-making and control of the vehicle over to vehicle systems can allow the vehicle's passengers to devote their attention to tasks other than driving. Some situations, however, can arise during navigation that may impact a vehicle's ability to navigate toward a destination.

SUMMARY

Example embodiments described herein relate to techniques for providing incremental remote assistance to an autonomous vehicle through the use of waypoints. Wireless communication between a computing device and vehicle systems can allow for a remote operator to review a complex or unexpected situation encountered by a vehicle and provide incremental guidance to help the vehicle safely overcome the situation without requiring the vehicle to pull over or otherwise stop unnecessarily. The computing device may use a graphical display interface (GUI) to help convey the vehicle's situation and enable the operator to review and provide waypoints incrementally that can guide the vehicle beyond obstacles.

In one aspect, an example method is provided. The method involves receiving, at a computing device, location information from a vehicle. The vehicle is autonomously navigating to a destination, and the computing device is positioned at a remote location relative to the vehicle. The method also involves displaying a representation of an environment of the vehicle based on the location information and receiving, at the computing device, a first input specifying a first waypoint and a second input specifying a second waypoint positioned on the representation of the environment. The computing device is configured to limit: (i) a location of the first waypoint based on a first location of the vehicle, and (ii) a location of the second waypoint based on a second location of the vehicle or the location of the first waypoint. The method further involves providing route instructions to the vehicle based on at least the first waypoint or the second waypoint.

In another aspect, an example system is provided. The system includes a vehicle, and a computing device positioned at a remote location relative to the vehicle. The computing device is configured to receive location information from the vehicle. The vehicle is autonomously navigating to a destination. The computing device is further configured to display a representation of an environment of the vehicle based on the location information and receive a first input specifying a first waypoint and a second input specifying a second waypoint positioned on the representation of the environment. The computing device is configured to limit: (i) a location of the first waypoint based on a first location of the vehicle, and (ii) a location of the second waypoint based on a second location of the vehicle or the location of the first waypoint. The computing device is also configured to provide route instructions to the vehicle based on at least the first waypoint or the second waypoint.

In yet another example, an example non-transitory computer-readable medium configured to store instructions, that when executed by a computing device comprising one or more processors, causes the computing device to perform operations. The operations include receiving location information from a vehicle where the vehicle is autonomously navigating to a destination, and displaying a representation of an environment of the vehicle based on the location information. The operations also include receiving a first input specifying a first waypoint and a second input specifying a second waypoint positioned on the representation of the environment. A location of the first waypoint is limited based on a first location of the vehicle, and a location of the second waypoint is limited based on a second location of the vehicle or the location of the first waypoint. The operations also include providing route instructions to the vehicle based on at least the first waypoint or the second waypoint.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6C depicts the situation shown in FIGS. 6A and 6B, according to one or more example embodiments.

DETAILED DESCRIPTION

Figure 1:
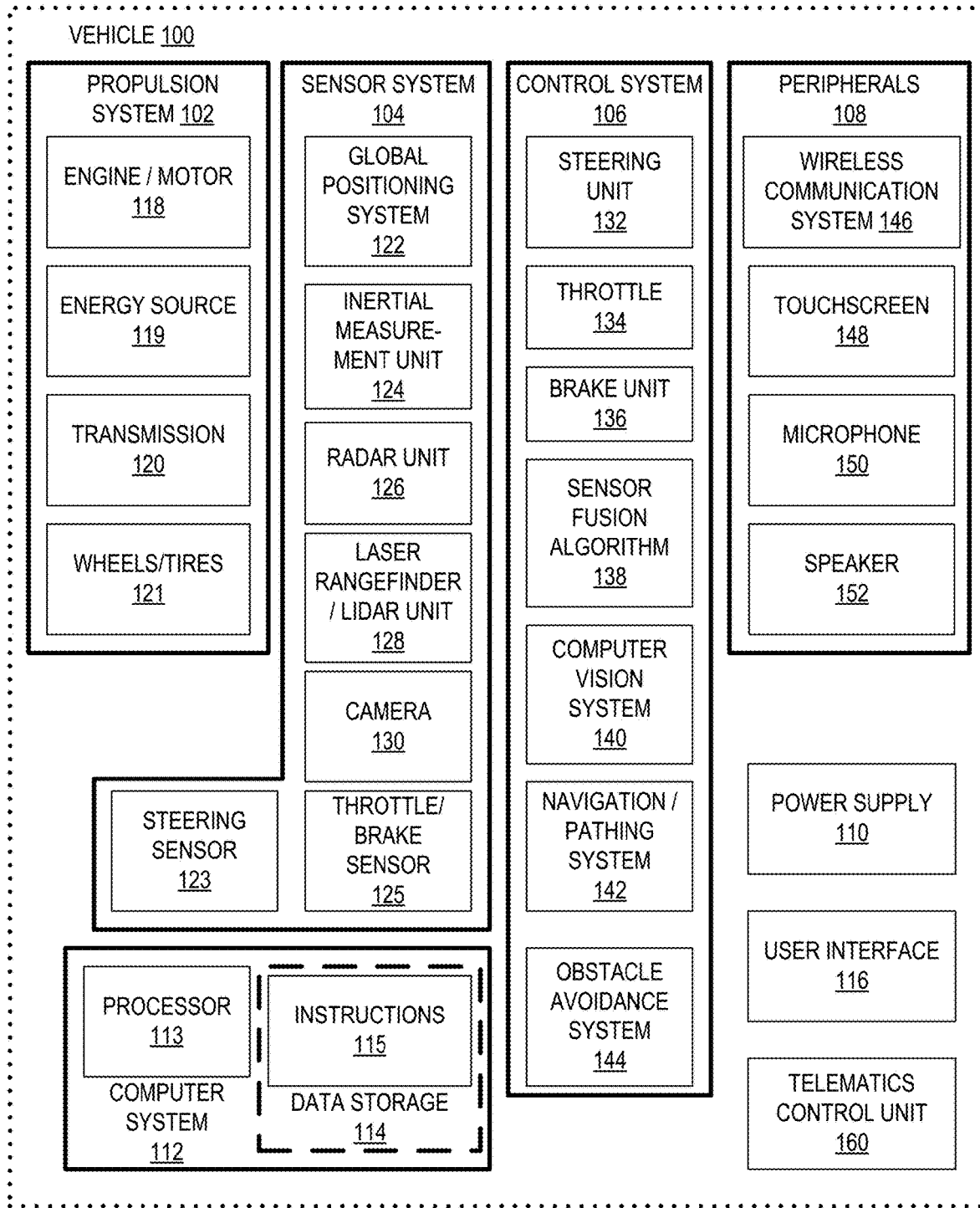
FIG. 1 is a functional block diagram illustrating a vehicle, according to example implementations.
Figure 2A:
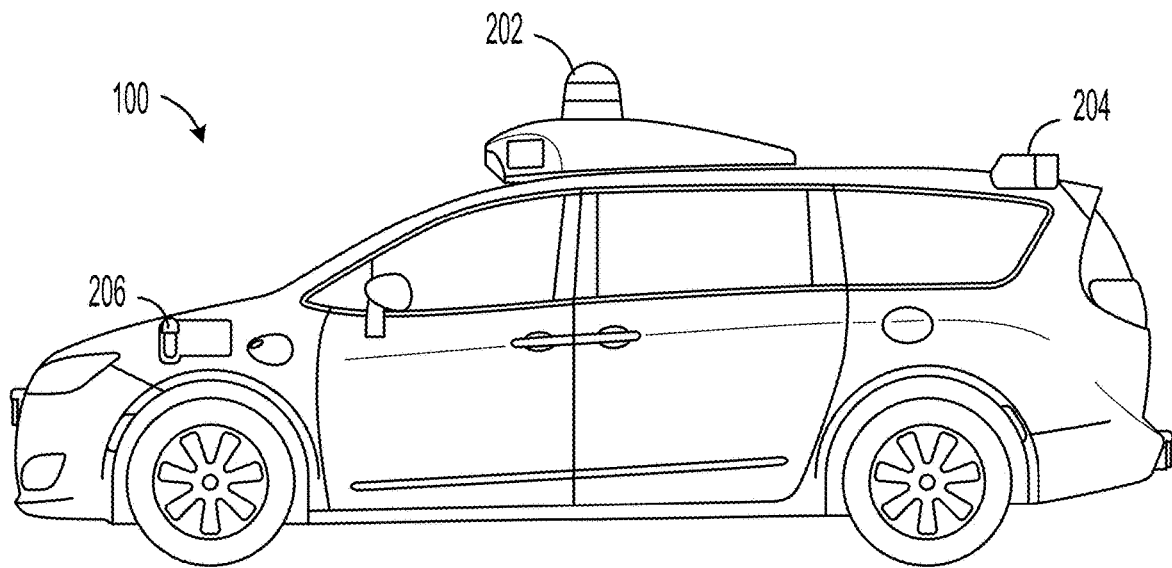
FIG. 2A illustrates a side view of a vehicle, according to one or more example embodiments.
Figure 2B:
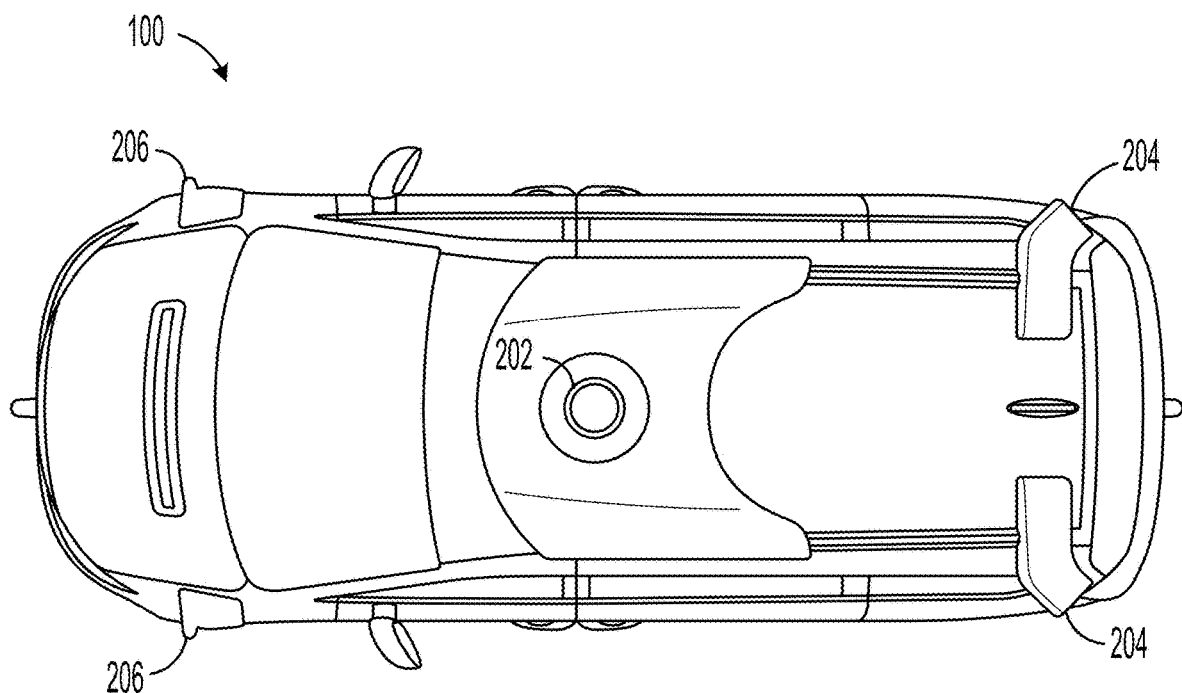
FIG. 2B illustrates a top view of a vehicle, according to one or more example embodiments.
Figure 2C:
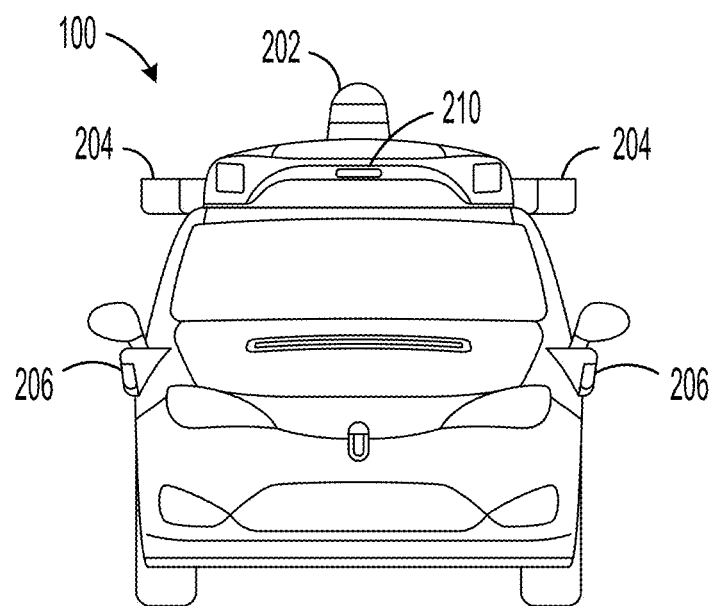
FIG. 2C illustrates a front view of a vehicle, according to one or more example embodiments.
Figure 2D:
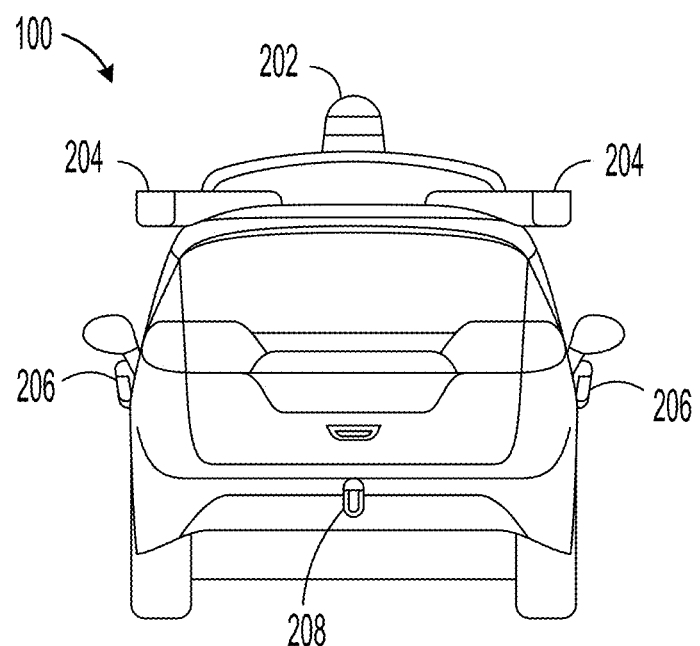
FIG. 2D illustrates a back view of a vehicle, according to one or more example embodiments.
Figure 2E:
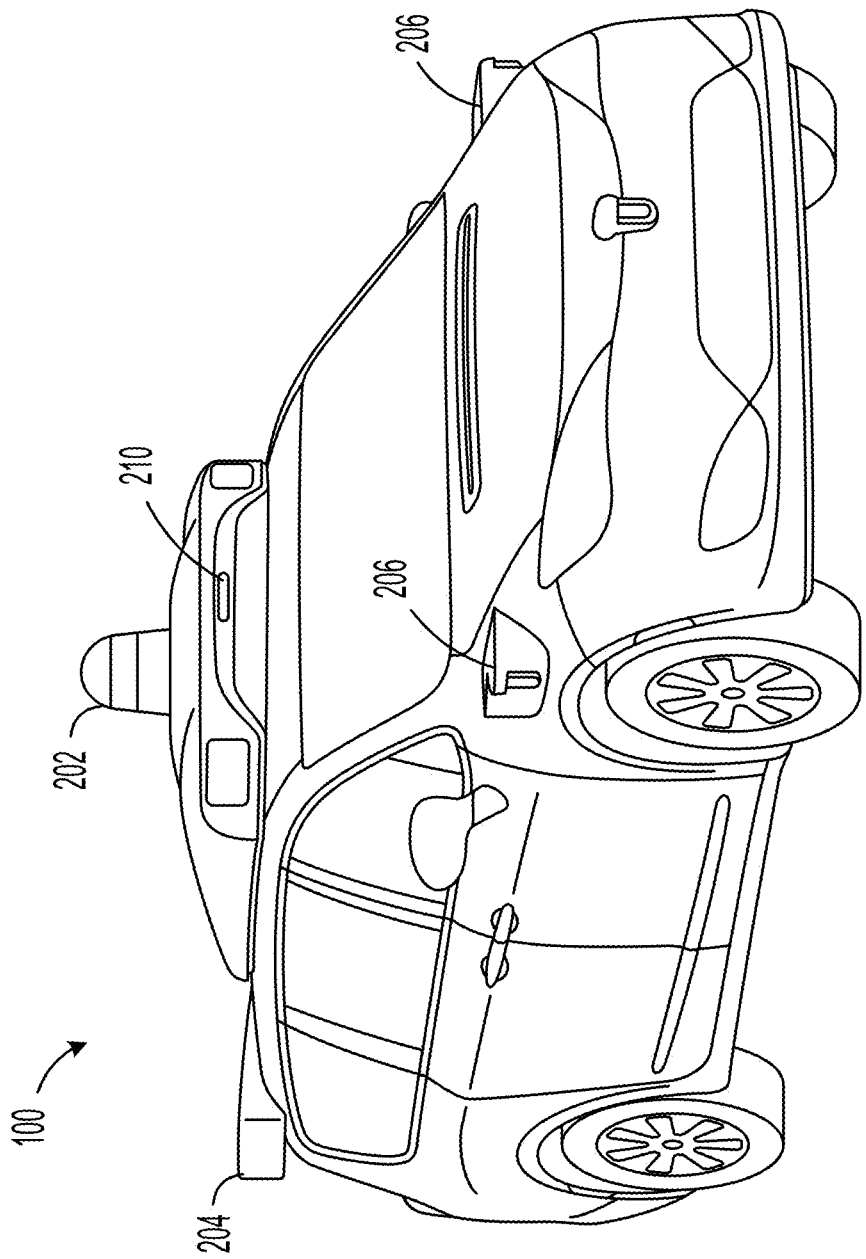
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As a vehicle navigates to a destination in an autonomous or semi-autonomous mode, the vehicle may encounter some situations that can interfere and potentially block its current trajectory. For instance, construction sites, poorly marked roadways, or obstructed views of signs or pathways can alter and sometimes limit a vehicle's ability to navigate its surrounding environment. In situations where vehicle systems fail to independently overcome obstacles encountered during navigation, remote assistance offers a solution that can help guide the vehicle and resolve the situation. A vehicle may request assistance from a remote human operator, who can then provide route instructions that the vehicle can use to overcome an obstacle.

Although remote assistance can help vehicles resolve issues encountered during navigation, existing remote assistance techniques typically involve the vehicle coming to a stop until an operator can provide an augmented trajectory that allows navigation to resume. Stopping and waiting for remote assistance can negatively impact the experience of passengers and/or delay the delivery of cargo carried by the vehicle. In addition, the existing remote assistance techniques often require the human operator to provide a single trajectory that can resolve an immediate issue, such as an occluded sign, obstacle impeding a path, or an inaccurate object identification. Some situations, however, may be too difficult for a remote operator to resolve with a single augmented trajectory. This may be due to the nature of the situation (e.g. construction zone that continues for a long distance), or because the remote operator is not able to see far enough ahead in the scene to provide a complete trajectory.

Example embodiments presented herein enable remote assistance to be provided to an autonomous vehicle incrementally through the use of waypoints. Such remote assistance techniques can be used to guide a vehicle through various extended situations, such as construction zones or other circumstances that might require remote assistance to be provided in an incremental manner.

An example embodiment may involve a computing device initially receiving location information from a vehicle. For instance, the vehicle may be navigating toward a destination in an autonomous mode or semi-autonomous mode and encounter a situation that impacts its current trajectory. A human operator may already be monitoring the vehicle via wireless communication with the vehicle or may receive a request for assistance from the vehicle that initiates communication between vehicle systems and a remote device used by the human operator. For instance, the vehicle may detect the presence of a construction site that modifies existing road lanes and extends beyond the current field of views of forward facing vehicle sensors, which may trigger vehicle systems to request assistance when confidence with handling the situation is low (e.g., below a threshold confidence level).

In some cases, location information for the vehicle can enable the computing device (and potentially a human operator) to provide assistance. For instance, the information received from the vehicle may include a current location, a target destination for the vehicle, and other information about the vehicle (e.g., type of vehicle). The computing device can use the information received from the vehicle to either assist the vehicle and/or enable a remote human operator to review the situation and provide assistance. For example, the computing device may generate a graphical user interface (GUI) that displays information regarding the vehicle's situation for a human operator to use, such as a representation of the vehicle's environment. The GUI may display one or more road maps of the vehicle's current area and/or sensor data received from the vehicle, such as images or other representation of the environment. In some examples, the GUI may depict a combination of sensor data received from the vehicle and map data to show potential obstacles or other features located nearby the vehicle.

The GUI can be used to receive operator inputs provided to assist the vehicle, which may be provided incrementally by the operator. For instance, the GUI may prompt and allow the human operator to input a series of inputs that specify locations for waypoints that the vehicle can follow to navigate past an identified obstacle or situation. The computing device may use the operator's input to generate and send route instructions for the vehicle to perform. In some examples, the GUI can display instructions that help guide the human operator to provide assistance to the vehicle. For instance, the GUI may display the road map and/or other information representing the vehicle's situation along with text that requests selection of a path for the vehicle to perform via waypoints. The computing device may then use the specified waypoints or information provided by the operator to generate and deliver route instructions for the vehicle to perform.

In some embodiments, the computing device can combine sensor data and maps to depict augmented maps of the vehicle's environment. For instance, the computing device can access sensor data from multiple vehicles, which may indicate the presence of construction barriers and/or another type of obstacle at a location. The computing device may then modify road map data for that location to include an indication of the construction barriers and/or the other type of obstacle. This information can then be provided to operators in near real-time to allow operators to resolve incoming assistance requests more effectively with the additional information supplemented by vehicles.

In some examples, the computing device may be programmed to enforce constraints on where the human operator can position waypoints when providing assistance. The constraints can depend on the environment and vehicle parameters. Environment factors can include the location of the vehicle and any detected obstacles at the location (e.g., construction), type of roadway and number of lanes (e.g., city road, highway, etc.), speed limit, traffic conditions, and weather (e.g., rain and wet roads), among others. Vehicle parameters can include the type and size of the vehicle and navigation factors (e.g., trajectory, speed, heading, and destination), among other potential operational aspects.

The constraints can limit options available to the human operator providing remote assistance and may generate route instructions for the requesting vehicle that are based on a combination of human input and computational output in some examples. For instance, the computing device may prompt the operator to provide a waypoint or multiple waypoints that aim to guide the vehicle relative to obstacles. The computing device can also suggest waypoints that the remote operator can review and approve, reject, and/or modify.

In addition, the computing device may also limit where waypoints can be positioned based on one or more limitations, such as distance relative to the vehicle and/or prior waypoints and/or relative to round boundaries, the type of situation and obstacles, alternative navigation options available, and the position of other elements in the environments. As an example, the GUI may be configured to limit a position of a first waypoint based on the current location of the vehicle. For instance, the GUI may allow a human operator to position the first waypoint only at locations within a threshold distance from the current location of the vehicle and subsequent waypoints may be limited to within the threshold distance relative to the prior waypoint selected by the human operator. Using distance limitations for the placement of waypoints can help guide the human operator to place waypoints in a way that allows for efficient assistance to be provided for the vehicle. In addition, the computing device can also restrict how far side-to-side waypoints can be placed, which help maintain the heading of the vehicle relative to road boundaries.

In some examples, other types of limitations can be used to help guide the human operator providing assistance to a vehicle. For example, boundary limitations can be enforced by the GUI to prevent the placement of waypoints in specific locations that can cause navigation issues for the vehicle. For instance, boundary limitations can be used by the GUI to prevent the human operator from positioning waypoints on sidewalks, unsafe areas, and other locations that vehicles should avoid during navigation. In some instances, there may be lateral constraints used by the computing device to prevent waypoints that extend too far off a straight trajectory of a road.

Visual and other types of cues (e.g., audio) can be used by the computing device and the GUI to convey information about the limitations and/or suggestions to the human operator in addition to information related to the vehicle's situation. Cues can include any combination of text, colors, arrows, audio or tactile alerts, etc. For instance, the GUI may use different colors and/or text to convey which areas on the road map or other type environment representation can be selected for placing waypoints and/or indicate the locations for waypoints suggested by the computing device for the remote operator to review. As an example, areas on the road map where the human operator may position waypoints can be highlighted in a first color (e.g., green) and off-limit areas (e.g., areas located outside the threshold distance from the current location of the vehicle or the prior waypoint) can remain uncolored or highlighted in another color (e.g., red) to differentiate from the areas highlighted in the first color. The GUI can also use text, audio, and/or tactile alerts (e.g., vibrations) to help convey when a waypoint is positioned in an appropriate location (or an off-limit location) per the limitations being enforced by the computing device.

The computing device can receive operator inputs in various ways. For instance, a touchscreen interface, buttons, or other type of input mechanism can enable a human operator to provide inputs when providing assistance to a vehicle. In some instances, the computing device may enable a series of waypoints to be delivered in a sequential manner by drawing vectors. For example, the GUI may prompt the human operator to initiate the series of waypoints by highlighting the current location of the vehicle and having the operator draw a vector from the current location to a location for the first waypoint. From the first waypoint, the GUI may allow another vector to be drawn to a position for a second waypoint. The lengths of the vectors can be limited to guide the human operator to place a series of waypoints that can be used to guide the vehicle out of the encountered situation. In some instances, the computing device may allow the human operator to select locations directly on the map or representation of the environment via touchscreen or other inputs.

In addition, the computing device can customize the different limitations used by the GUI based on the situation. For example, the computing device can remove or modify (e.g., increase or decrease) one or more distance limitations used when guiding a human operator to provide waypoints to assist a vehicle. The computing device can also enable some limitations to be turned on and off.

In some embodiments, the computing device can further provide one or more smart suggestions for an operator to review in order to provide assistance to a vehicle. For instance, the computing device can use information received from a vehicle to suggest one or more waypoints (or a route) for the vehicle to subsequently perform via a display interface. For instance, the computing device may receive and suggest the waypoints based on a current route and destination for the vehicle, environment parameters (e.g., types of road, weather conditions), and/or obstacles detected, etc. The remote operator can then quickly review suggested waypoints, which may involve confirming or denying each waypoint and/or collectively approving the suggested route formed by the waypoints. In addition, the remote operator may also modify one or more suggested waypoints.

In some examples, remote assistance can be provided incrementally to a vehicle with a remote computing device prompting when additional review from the operator is desired. For instance, the computing device may provide a first waypoint or set of waypoints for a human operator to review and confirm/reject/modify to initially assist a vehicle. The computing device can provide suggested waypoints or trajectories based on limitations described herein. As the vehicle progresses according to the initial assistance, the computing device may provide a subsequent waypoint or waypoints for the human operator to review and confirm/reject/modify. The computing device can enable the human operator to incrementally assist the vehicle as the vehicle navigates through a situation without requiring the vehicle to unnecessarily stop to receive additional assistance from the operator. In some instances, the computing device can allow the human operator to provide incremental assistance in near real-time to vehicles.

In some embodiments, remote assistance may be provided for larger vehicles, such as semi-trucks that can be used to transport cargo between locations. Semi-trucks and other larger vehicles can have sensors positioned at heights that enable long distance measurements with unoccluded field of views. As such, a remote computing device can use long distance sensor measurements and other information provided by a semi-truck or another type of large vehicle to enable a remote operator to assist the semi-truck. By way of an example, a remote operator may use long distance images and/or other information received from a semi-truck to incrementally assist the semi-truck navigate through a construction site or another situation that may require some form of assistance. The computing device may use incoming information received from the semi-truck to provide suggestions that the remote operator can quickly review and approve, rejector, and/or modify.

Example techniques can allow for a remote operator to provide assistance to a vehicle with less latency, which can allow the vehicle to receive and execute operations based on the assistance before the vehicle even comes to a stop in some instances. In addition, these techniques can be useful for autonomous trucking and/or in specific situations, such as marking waypoints that adhere to different lane layouts that can arise within large construction zones.

In some embodiments, remote assistance may involve establishing a secure communication connection between a human operator and one or more vehicle systems or passengers traveling within a vehicle. The human operator may receive sensor data depicting the environment in near real-time and provide assistance to the vehicle (or passengers) immediately.

Example systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in enabling navigation by vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
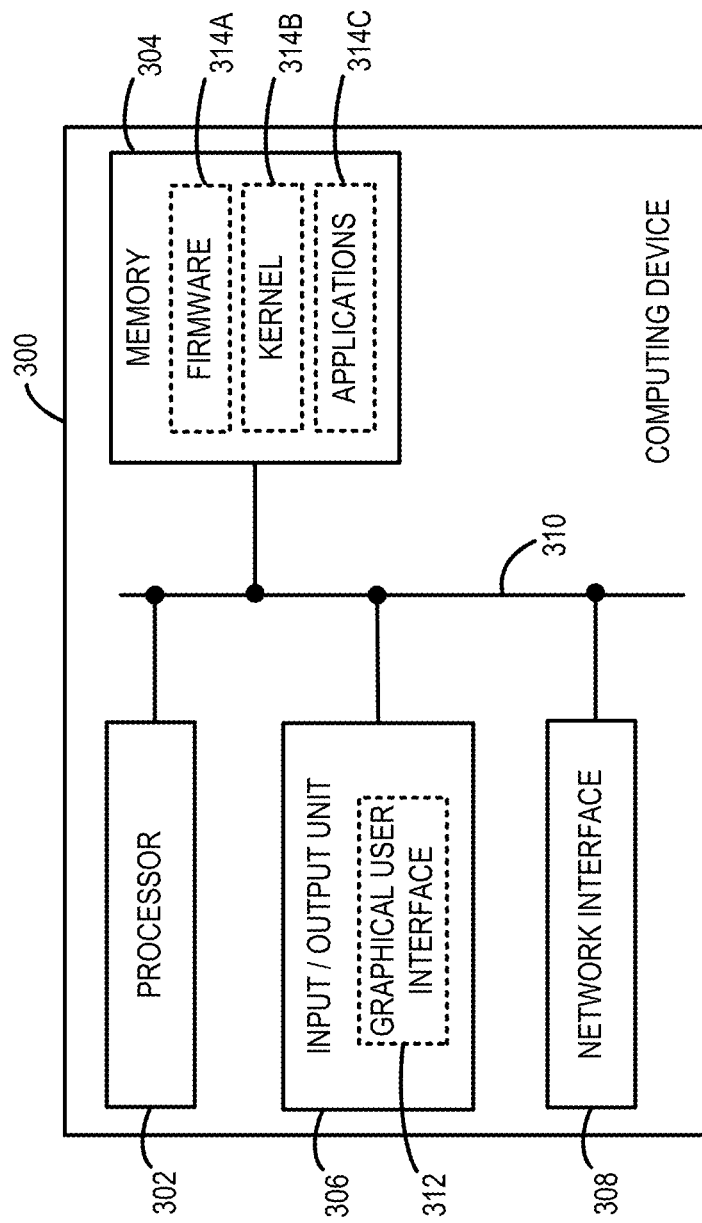
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may involve one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
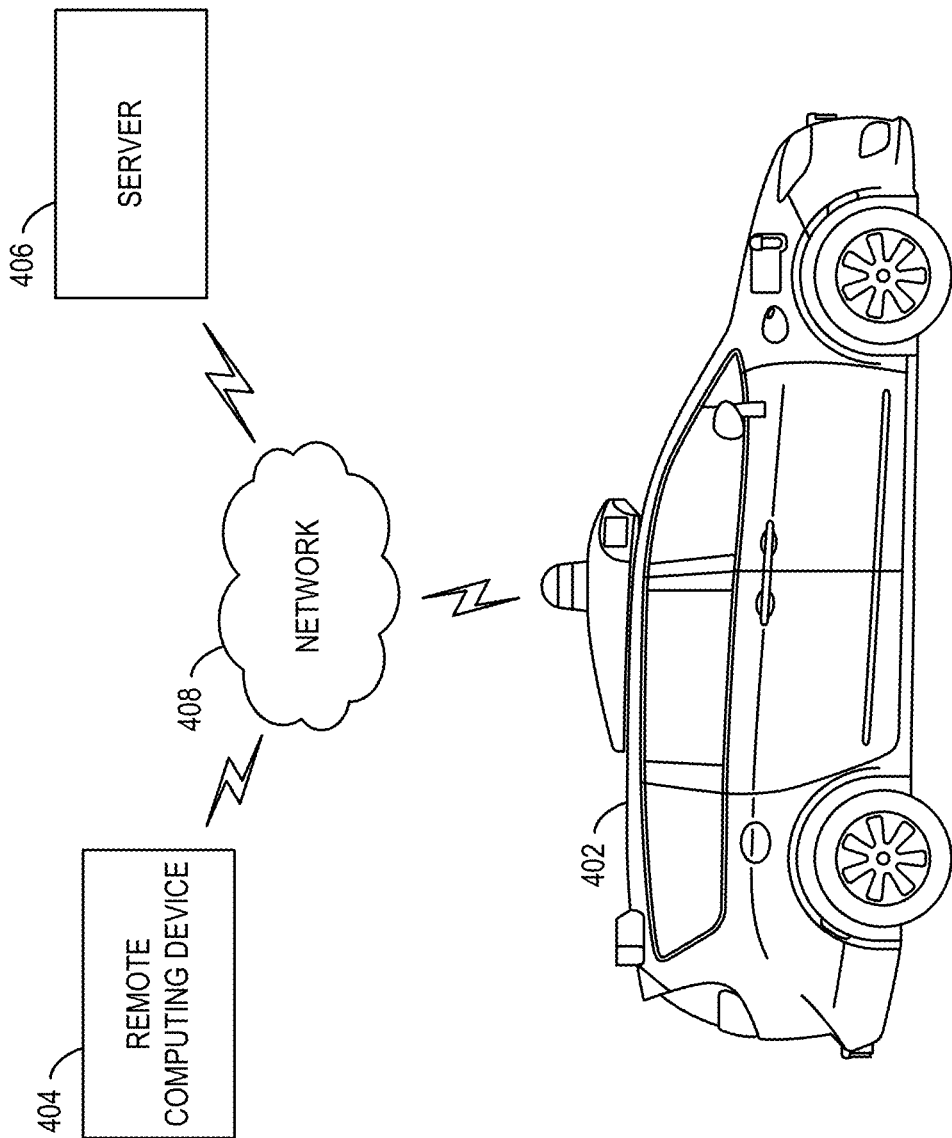
FIG. 4 is a system for wireless communication between computing devices and a vehicle, according to one or more example embodiments.

FIG. 4 is a system for wireless communication between computing devices and a vehicle, according to one or more example embodiments. System 400 may enable vehicles (e.g., vehicle 402) to obtain remote assistance from human operators using computing devices positioned remotely from the vehicles (e.g., remote computing device 404). Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may transport passengers or objects between locations, and may take the form of any one or more of the vehicles discussed above, including passenger vehicles, cargo shipping vehicles, farming and manufacturing vehicles, and dual-purpose vehicles. When operating in an autonomous mode (or semi-autonomous mode), vehicle 402 may navigate to pick up and drop off passengers (or cargo) between desired destinations. In some embodiments, vehicle 402 can operate as part of a fleet of vehicles, such as within a fleet of ride-share vehicles.

Remote computing device 404 may represent any type of device related to enabling remote assistance techniques, including but not limited to those described herein. Within examples, remote computing device 404 may represent any type of device configured to (i) receive information related to vehicle 402, (ii) provide an interface (e.g., a GUI, physical input interfaces) through which a human operator can in turn perceive the information and input a response related to the information, and (iii) transmit the response to vehicle 402 or to other devices (e.g., storage at server 406). As such, remote computing device 404 may take various forms, such as a workstation, a desktop computer, a laptop, a tablet, a mobile phone (e.g., a smart phone), a wearable device (e.g., a headset) and/or a server. In some examples, remote computing device 404 may include multiple computing devices operating together in a network configuration. In further embodiments, remote computing device 404 may resemble a vehicle simulation center with the remote operator positioned as the drive of the simulation center. In addition, remote computing device 404 may operate as a head mountable device that can simulate the perspective of vehicle 402.

The position of remote computing device 404 relative to vehicle 402 can vary within examples. For instance, remote computing device 404 may have a remote position from vehicle 402, such as operating inside a physical building. In another example, remote computing device 404 may be physically separate from vehicle 402, but operate inside vehicle 402 to enable a passenger of vehicle 402 to act as the human operator. For instance, remote computing device 404 can be a touchscreen device accessible to a passenger of vehicle 402. Operations described herein that are performed by remote computing device 404 may be additionally or alternatively performed by vehicle 402 (i.e., by any system (s) or subsystem(s) of vehicle 100). In other words, vehicle 402 may be configured to provide a remote assistance mechanism with which a driver or passenger of the vehicle can interact.

Operations described herein can be performed by any of the components communicating via network 408. For instance, remote computing device 404 may determine remote assist options for a human operator to review based on different levels of information provided by vehicle 402. In some embodiments, vehicle 402 may determine potential navigation options for remote computing device 404 to display for a remote operator to review. Potential options could include routes, vehicle movements, and other navigation parameters for review by remote computing device 404 and/or a remote operator using remote computing device 404.

In other embodiments, remote computing device 404 may analyze sensor data or other information from vehicle 402 to determine the situation and potential options for a remote operator to review. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. As such, server 406 may be configured to perform any operation(s), or portions of such operation(s), that is/are described herein as performed by remote computing system 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network.

In some embodiments, remote assistance for vehicles can originate from a network of remote operators. For example, a vehicle may submit a request for assistance that is received at an entry point of the network. The entry point may connect the request with a remote operator that can provide assistance. The remote operator may be selected based on credentials associated with the remote operator that indicate that she or he is able to handle the type of assistance that is being requested and/or the operator's availability, among other potential parameters. The entry point may analyze information within the request to route requests for assistance accordingly. For example, the network of remote operators may be used to provide assistance to an entire fleet of autonomous vehicles.

Figure 5:
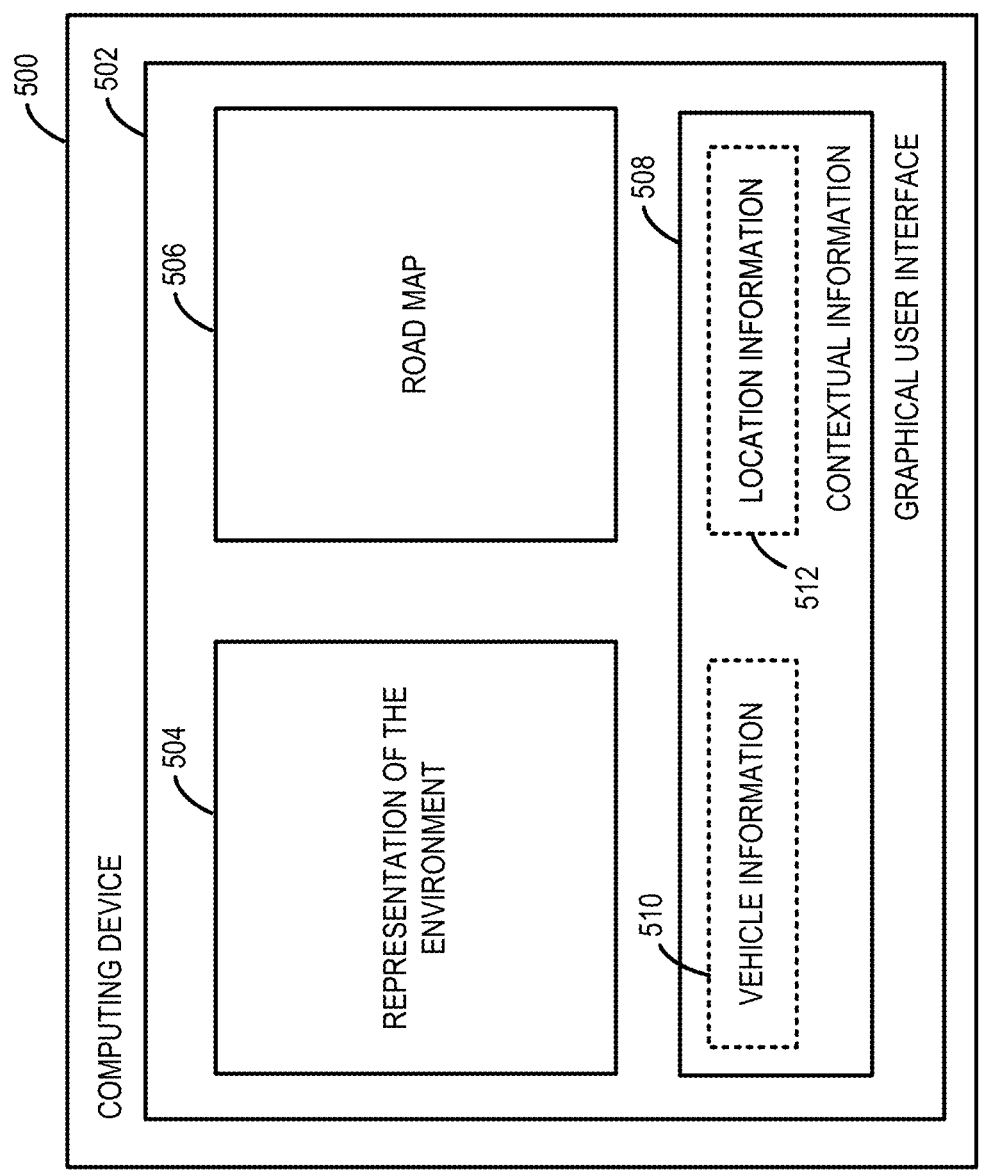
FIG. 5 illustrates a computing device displaying a graphical user interface for enabling remote assistance, according to one or more example embodiments.

FIG. 5 illustrates a computing device displaying a GUI for enabling delivery of remote assistance to a vehicle, according to one or more example embodiments. In the example embodiment, computing device 500 is shown with GUI 502 displayed, which includes various example visual elements: environment representation 504, road map 506, and contextual information 508. The elements are shown for illustration purposes and can be combined, further divided, and/or replaced or supplemented by other elements. For instance, GUI 502 may display only road map 506 in some implementations. In addition, the arrangement of the elements is for illustration purposes and can vary within implementations.

GUI 502 represents a system of interactive visual components for computer software, which can be used to display objects that convey information to a human remote operator and also represent actions that can be taken by the remote operator. For instance, computing device 500 may generate GUI 502 based on templates stored in memory and customized to a vehicle's given situation, which can enable an available remote operator to quickly review and provide assistance. In some cases, GUI 502 can allow the remote operator to provide waypoints that can be used to generate augmented route instructions that navigate vehicles with respect to an encountered obstacle or series of obstacles (e.g., a construction site). Computing device 500 may display GUI 502 on a display interface, such as a touch screen, external monitor, and/or a display interface associated with a head-mounted wearable computing device (e.g., augmented reality).

Computing device 500 may use GUI 502 to enable interaction between a human operator and vehicles that request assistance. For instance, the human operator may provide inputs to computing device 500 via touch inputs, buttons or hardware inputs, motion and vocal inputs. In some embodiments, computing device 500 may include a microphone that can receive vocal inputs and use speech recognition software to derive operations based on the vocal inputs from the operator. In addition, in some implementations, computing device 500 may resemble a vehicle emulator that can simulate the vehicle's perspective. GUI 502 is shown with various elements (e.g., environment representation 504, road map 506, and contextual information 508), which can be customized according to different settings enabled by computing device 500.

Environment representation 504 is an object displayable via GUI 502 that can represent the current environment (or a recent environment) from the perspective of the vehicle or from another view (e.g., a simulated bird's-eye view). For instance, environment representation 504 may involve displaying images and/or video of the environment as captured by vehicle cameras. In other instances, sensor data from different types of sensors can be used to generate and provide environment representation 504 via GUI 502. For instance, environment representation 504 may include data based on a point cloud developed using radar and/or LIDAR.

In some cases, environment representation 504 can represent (e.g., show) the positions of obstacles or other environment elements that may have disrupted the path of travel of the vehicle as well as other features positioned nearby. For example, environment representation 504 may depict other vehicles, pedestrians, bicycles, traffic signals and signs, road elements and barriers, and other features within the vehicle's environment. Computing device 500 may use visual indicators, such as arrows, boxes, or a combination to highlight aspects of the environment, such as the obstacles blocking the path of travel of the vehicle. For example, computing device 500 may use computer vision to detect elements within images and identify elements using different colors, such as red boxes to identify pedestrians, blue boxes for other vehicles, and green boxes for stationary objects.

Computing device 500 may further obtain and display road map 506 and/or other types of map data based on a location of the vehicle. Road map 506 may represent one or more maps of roads based on the current location and route of the vehicle. For instance, the vehicle may provide GPS measurements or another indication of the vehicle's location within the request for assistance or during subsequent communication between the vehicle and computing device 500. By using the vehicle's location, computing device 500 can acquire road map 506 and further enhance the information included within environment representation 504 and/or other objects displayed via GUI 502. For instance, road map 506 can be augmented to display obstacles detected in vehicle sensor data from the assistance requesting vehicle and/or other vehicles that captured measurements of that area. In some examples, computing device 500 can determine and display environment representation 504 as an elevated view of the vehicle and nearby surroundings estimated based on road map 506 and the sensor data from the vehicle. In some examples, GUI 502 may include both a sensor perspective of the vehicle's environment and the elevated view estimated based on one or both of the sensor data and/or road map 506.

GUI 502 also includes contextual information 508, which may convey additional information to supplement a remote operator's understanding of the vehicle's situation. As shown in FIG. 5, contextual information 508 includes vehicle information 510 and location information 522. Vehicle information 510 may indicate a variety of information about the vehicle, such as the type of vehicle, the vehicle sensors on the vehicle, the quantity of the passengers, and target destination, etc. Location information 522 may represent information based on the current location of the vehicle, such as map data depicting the environment. Contextual information 508 may also specify information related to the situation, such as how long has the vehicle been stranded and a reason proposed by the vehicle for the stranding.

Figure 6A:
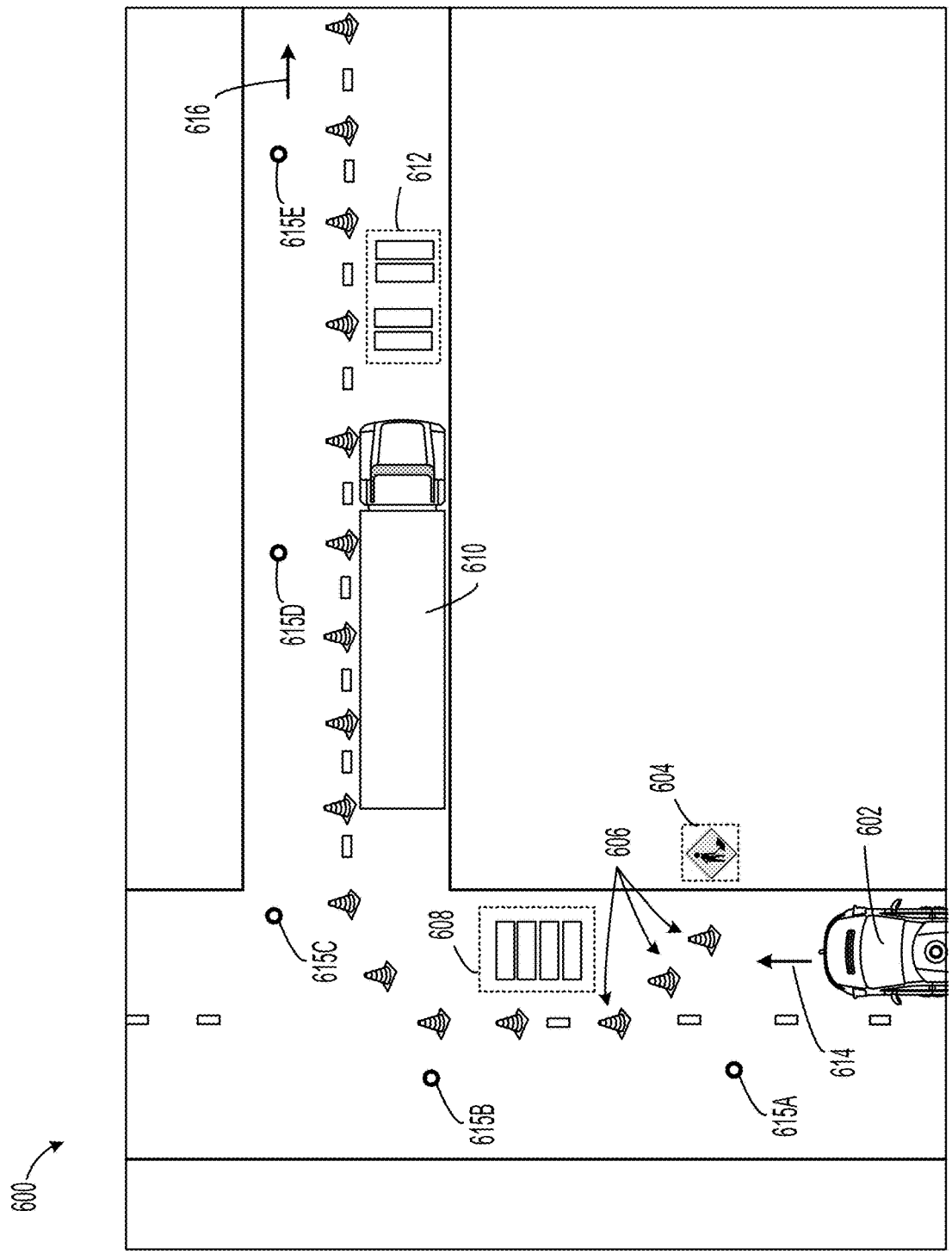
FIG. 6A depicts a situation involving a vehicle receiving incremental remote assistance, according to one or more example embodiments.
Figure 6B:
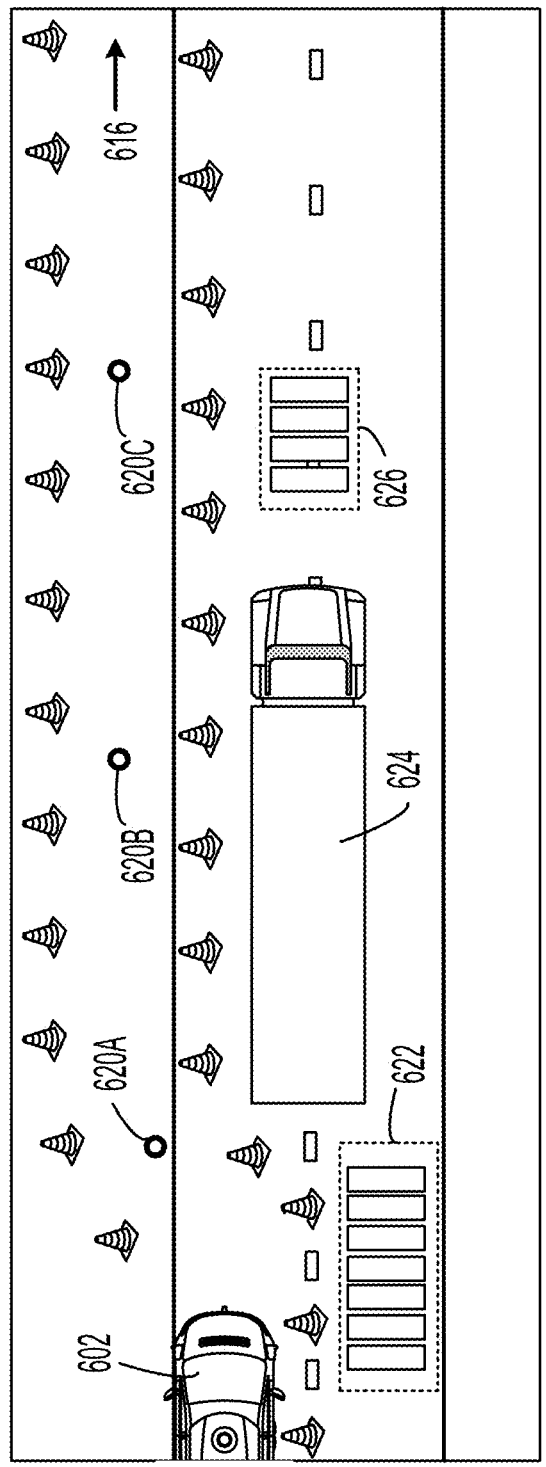
FIG. 6B depicts the situation shown in FIG. 6A, according to one or more example embodiments.

FIG. 6A, FIG. 6B, and FIG. 6C depict a situation involving a vehicle receiving incremental remote assistance, according to one or more example embodiments. In particular, situation 600 involves vehicle 602 encountering a construction site during autonomous or semi-autonomous navigation toward destination 616, which is illustrated from a bird-eye's view in FIGS. 6A-6C.

As shown in FIGS. 6A-6C, the construction site extends around a right corner located relative to the current location of vehicle 602, which may reduce the ability for vehicle systems to navigate the lane modifications caused by the construction site. The construction site extends along the roads and blocks one traffic lane in some areas, which alters the traffic lanes the vehicles should from the typical road-drawn lanes. In some examples, vehicle 602 may be able to safely navigate toward destination 616 without reliance on remote assistance. In other examples, vehicle 602 may determine that remote assistance is needed. The remote assistance may require incremental assistance as vehicle 602 navigates toward destination due to the modifications to the environment caused by the construction site.

As such, the construction site represents one possible scenario where a vehicle (e.g., vehicle 602) may request and use incremental remote assistance to overcome potential obstacles that may be an extended issue for the vehicle when operating in an autonomous or semi-autonomous mode. Vehicles may encounter other various situations that might require remote assistance to be provided incrementally by the operator during navigation.

FIG. 6A shows the initial detection of the construction site by vehicle 602, which may trigger vehicle systems to determine that assistance is needed. In the example shown in FIG. 6A, situation 600 depicts vehicle 602 located toward an end of the construction site that extends along multiple roads, which impacts the current path 614 of vehicle 602 toward its destination 616. The construction site includes construction sign 604 and traffic cones 606 blocking off the areas of the roads undergoing construction from vehicles. This area further includes construction materials 608, 612 and parked truck 610.

When unable to safely modify its route to overcome a situation (e.g., navigate past the construction site), vehicle 602 may submit a request for remote assistance. In the example shown in FIG. 6A, vehicle 602 may determine that current path 614 is obstructed by traffic cones 606 associated with the construction site based on sensor analysis. In some instances, analysis of the environment by vehicle 602 may also include identification of road construction sign 604. In some implementations, if the vehicle control system is unable to circumvent the construction site with confidence above a confidence threshold, the vehicle control system of vehicle 602 may request assistance to enable further navigation toward destination 616. For instance, the vehicle control system may analyze trajectory modifications to circumvent the construction site, but fail to identify modifications that meet a confidence threshold required to continue navigation. In some cases, vehicle systems may be able to detect the presence of additional traffic cones 606 and/or other construction elements that extend around the turn in the direction of destination 616 within sensor data received from its current location, which can be factored into determining whether assistance is required.

Vehicle 602 can be configured to automatically request assistance in certain situations. For instance, vehicle 602 may request a remote operator to monitor and potentially help guide its subsequent navigation through the construction zone upon detecting the construction zone or in response to detecting workers within the construction zone. In some cases, vehicle 602 may submit the assistance request in a way that enables assistance to potentially be received by vehicle 602 without requiring vehicle 602 to pull-over or come to a stop. In other cases, vehicle 602 may initially stop until receiving initial route instructions, which may be incrementally supplemented as vehicle 602 navigates per the initial route instructions. This way, vehicle 602 can receive incremental assistance from a remote computing device or human operator with minimal disruptions during navigation.

As further shown in FIG. 6A, remote assistance may provide vehicle 602 with augmented route instructions that help guide vehicle 602 through the construction site and toward destination 616. For example, a remote human operator (or a remote computing device) may provide one or more waypoints 615A, 615B, 615C, 615D, 615E that can help serve as route instructions for vehicle 602.

FIG. 6B depicts vehicle 602 at a different location relative to the construction site involved in situation 600. At this location, remote assistance may guide vehicle 602 according to waypoints 620A, 620B, 620C to obey traffic cones 606 and avoid construction materials 622, 626 and truck 624. For instance, a human operator may provide a first increment of assistance when vehicle 602 first requested assistance, such as previously shown in FIG. 6A and then provide a second increment of assistance at its current location shown in FIG. 6B. Thus, as vehicle 602 navigates through traffic cones 606 to avoid the construction site, the human operator can guide through additional waypoints and/or other trajectory suggestions without requiring vehicle 602 to stop unnecessarily. As further shown in FIG. 6B, remote assistance can be used to help a vehicle navigate situations that involve vehicles temporarily ignoring lane markings and/or other road elements.

FIG. 6C depicts vehicle 602 located near the end of the construction site involved in situation 600. At this position, vehicle sensors may show that the road is blocked one-way requiring vehicle 602 to navigate in the opposite direction toward 616. A remote operator may help guide vehicle 602 using waypoints 630A, 630B, 630C, 630D to circumvent the final portion of the construction site that includes construction materials 632, 634 and toward destination 616.

In the example shown in FIGS. 6A-6C, a computing device may enable a remote operator to provide one or more waypoints according to suggestions and/or limitations enforced by the computing device. In some examples, the computing device may suggest the waypoints to enable the remote operator to quickly review and accept, reject, and/or modify the waypoints or a trajectory formed by the waypoints. The computing device can suggest the waypoints based on travel of other nearby vehicles captured in sensor data received from a vehicle and/or parameters, such as positions of obstacles, road ways, type of road, and/or type of vehicle, etc.

Figure 7:
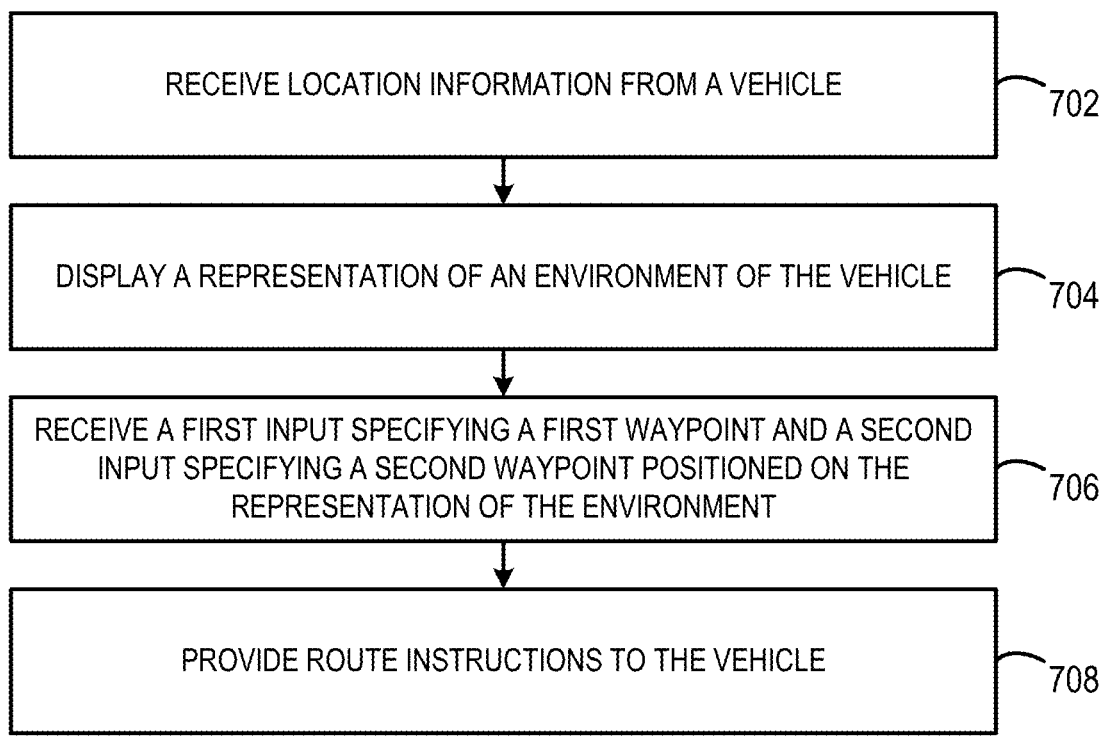
FIG. 7 is a flow chart of a method for implementing incremental remote assistance, according to one or more example embodiments.

FIG. 7 is a flow chart of a method for providing incremental remote assistance to a vehicle, according to example implementations. Method 700 represents an example method that may include one or more operations, functions, or actions, as depicted by one or more of blocks 702, 704, and 706, each of which may be carried out by any of the systems, devices, and/or vehicles shown in FIGS. 1-6C, among other possible systems. For instance, system 400 depicted in FIG. 4 may enable execution of method 700.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 702, method 700 involves receiving location information from a vehicle. The vehicle may be autonomously navigating to a destination. In addition, the computing device receiving the location information may be positioned at a remote location relative to the vehicle. In some examples, the computing device may be a personal computing device used by a passenger in the vehicle. For instance, the computing device can be a smartphone, mobile computing device, or a wearable computing device.

In some examples, the computing device receives the location information with a request for assistance from the vehicle. The request for assistance can indicate the first location of the vehicle and the destination. The computing device can also receive other information from the vehicle, such as one or more images from vehicle cameras.

At block 704, method 700 involves displaying a representation of an environment of the vehicle based on the location information. The computing device may display the representation of the environment based on maps, sensor data, images, and/or other information received from the vehicle and/or other vehicles that previously navigated by the area. For instance, in some examples, the computing device may obtain a road map based on the location information for the vehicle and display the road map via a display interface (e.g., a GUI). In some examples, the computing device may receive a proposed route from the vehicle and display the proposed route on the representation of the environment of the vehicle. The computing device can also display instructions for a human operator to follow, such as text requesting selection of waypoints with the representation of the environment.

At block 706, method 700 involves receiving a first input specifying a first waypoint and a second input specifying a second waypoint positioned on the representation of the environment. In some examples, the computing device is configured to limit a location of the first waypoint based on a first location of the vehicle, and a location of the second waypoint based on a second location of the vehicle or the location of the first waypoint.

In some examples, the computing device is further configured to limit the location of the first waypoint within a first threshold distance from the first location of the vehicle, and the location of the second waypoint within a second threshold distance from the second location of the vehicle or the location of the first waypoint.

In some examples, the computing device may identify an obstacle in a current path of the vehicle based on the one or more images. The computing device is further configured to limit at least the location of the first waypoint or the location of the second waypoint based on the obstacle. For instance, the computing device can be further configured to limit the location of the first waypoint and the location of the second waypoint to respective locations positioned at least a threshold distance from the obstacle. In some examples, the threshold distance depends on an identification of the obstacle, which may be received from the vehicle or determined by the computing device.

At block 708, method 700 involves providing route instructions to the vehicle based on at least the first waypoint or the second waypoint. The vehicle can be configured to continue navigation according to the route instructions. In some instances, the computing device may receive an indication that the vehicle is navigating the environment based on the route instructions and then provide subsequent route instructions based on a subsequent input specifying a subsequent series of waypoints positioned on the road map. For example, the computing device may provide first route instructions based on a first waypoint and subsequently provide second route instructions based on a second waypoint.

In some examples, the computing device may receive a third input specifying a third waypoint and a fourth input specifying a fourth waypoint positioned on the representation of the environment. In some implementations, the computing device is configured to limit a location of the third waypoint based on a third location of the vehicle or the location of the second waypoint, and a location of the fourth waypoint based on a fourth location of the vehicle or the location of the third waypoint. As such, the computing device may provide route instructions further based on the third waypoint and the fourth waypoint.

In some examples, the computing device may receive the first input at a first time; and receive the second input at a second time subsequent to the first time. As such, the computing device may provide first route instructions based on the first input received at the first time, and then subsequently provide second route instructions based on the second input received at the second time. The computing device may further receive, at a third time, a third input specifying a third waypoint. The third time is subsequent to both the first time and the second time. The computing device may then provide third route instructions based on the third input received at the third time.

In some examples, the computing device can receive sensor data from the vehicle and detect an obstacle in a path of the vehicle based on the sensor data. The computing device may then display the representation of the environment with a buffer positioned around the obstacle. The computing device can limit waypoints to respective positions outside the buffer. The computing device may determine a radius of the buffer around the obstacle based on an identification of the obstacle.

In some examples, the computing device can visually highlight a first area of the representation of the environment suitable for the first waypoint and visually highlight a second area of the representation of the environment suitable for the second waypoint. For instance, the computing device can visually highlight the first area using a first color and visually highlight the second area using a second color.

In some examples, the computing may cause the GUI to highlight a first area suitable for a first waypoint in the series of waypoints based on the current location of the vehicle. In addition, responsive to receiving a first input specifying a first location for the first waypoint, the computing device may cause the GUI to highlight a second area suitable for a second waypoint in the series of waypoints based on the first location for the first waypoint. Responsive to receiving a second input specifying a second location for the second waypoint, the computing device may cause the GUI to highlight a third area suitable for a third waypoint in the series of waypoints based on the second location for the second waypoint.

Figure 8:
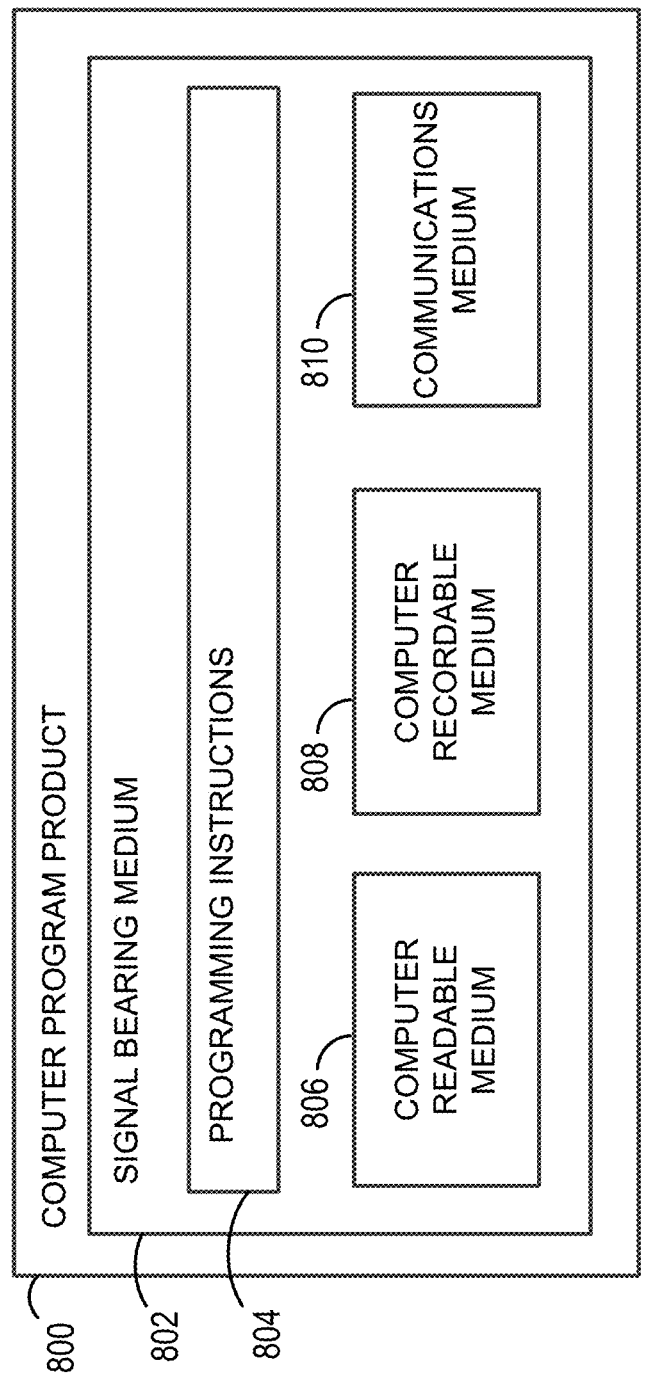
FIG. 8 is a schematic diagram of a computer program, according to one or more example embodiments.

FIG. 8 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In the embodiment shown in FIG. 8, computer program product 800 is provided using signal bearing medium 802, which may include one or more programming instructions 804 that, when executed by one or more processors may provide functionality or portions of the functionality described above with respect to FIGS. 1-7.

Signal bearing medium 802 may encompass a non-transitory computer-readable medium 806, such as, but not limited to, a hard disk drive, a Compact Disc (CD), a Digital Video Disk (DVD), a digital tape, memory, components to store remotely (e.g., on the cloud) etc. In some implementations, signal bearing medium 802 may encompass computer recordable medium 808, such as, but not limited to, memory, read/write (R/W) CDs, R/W DVDs, etc.

In some implementations, signal bearing medium 802 may encompass communications medium 810, such as, but not limited to, a digital and/or an analog communication medium (e.g., a fiber optic cable, a waveguide, a wired communications link, a wireless communication link, etc.). Similarly, signal bearing medium 802 may correspond to a remote storage (e.g., a cloud). A computing system may share information with the cloud, including sending or receiving information. For example, the computing system may receive additional information from the cloud to augment information obtained from sensors or another entity. Thus, for example, signal bearing medium 802 may be conveyed by a wireless form of communications medium 810.

One or more programming instructions 804 may be, for example, computer executable and/or logic implemented instructions. In some examples, a computing device such as computer system 112 shown in FIG. 1 or computing device 300 shown in FIG. 3 may be configured to provide various operations, functions, or actions in response to programming instructions 804 conveyed to the computer system by one or more of computer readable medium 806, computer recordable medium 808, and/or communications medium 810. The non-transitory computer readable medium could also be distributed among multiple data storage elements and/or cloud (e.g., remotely), which could be remotely located from each other. Computing device that executes some or all of the stored instructions could be a vehicle. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:

receiving, at a computing device, location information and sensor data from a vehicle, wherein the vehicle is autonomously navigating along a first path toward a destination, wherein the sensor data represents an environment of the vehicle, and wherein the computing device is positioned at a remote location relative to the vehicle;

based on the location information and the sensor data, determining a second path that enables the vehicle to navigate around an obstacle located in the first path;

generating, by the computing device, a set of waypoints for review by an operator, the set of waypoints being positioned according to the second path to enable the vehicle to safely navigate around the obstacle;

displaying, by the computing device, a representation of the environment of the vehicle with at least a first waypoint and a second waypoint from the set of waypoints displayed as part of the representation of the environment, wherein the computing device is configured to generate the set of waypoints such that:
  (i) a location of the first waypoint is within a threshold distance from a first location of the vehicle received with the location information, and
  (ii) a location of the second waypoint is within the threshold distance from the location of the first waypoint; and
providing route instructions to the vehicle based on at least the first waypoint or the second waypoint.

2. The method of claim 1, wherein receiving location information from the vehicle comprises:
receiving the location information with a request for assistance from the vehicle, wherein the request for assistance indicates the first location of the vehicle and the destination.

3. The method of claim 1, further comprising:
obtaining a road map based on the location information; and
wherein displaying the representation of the environment of the vehicle comprises:
displaying the road map.

4. The method of claim 1, wherein receiving location information and sensor data from the vehicle comprises:
receiving one or more images from the vehicle; and
wherein displaying the representation of the environment comprises:
displaying the one or more images.

5. The method of claim 4, further comprising:
identifying the obstacle located in the first path of the vehicle based on the one or more images, wherein the computing device is further configured to limit at least the location of the first waypoint or the location of the second waypoint based on the obstacle.

6. The method of claim 5, wherein the computing device is further configured to limit the location of the first waypoint and the location of the second waypoint to respective locations positioned outside a buffer positioned around the obstacle.

7. The method of claim 6, wherein a radius of the buffer depends on an identification of the obstacle.

8. The method of claim 1, further comprising:
receiving an input that conveys an approval of the first waypoint and the second waypoint positioned on the representation of the environment; and
wherein providing route instructions to the vehicle comprises:
providing route instructions to the vehicle responsive to receiving the input that conveys the approval of the first waypoint and the second waypoint.

9. The method of claim 1, further comprising:
receiving at least one input modifying the location of the first waypoint or the location of the second waypoint on the representation of the environment; and
wherein providing route instructions to the vehicle comprises:
providing route instructions to the vehicle further based on a modified location of the first waypoint or a modified location of the second waypoint.

10. The method of claim 1, further comprising:
receiving an input that conveys a rejection of one or both of the first waypoint and the second waypoint positioned on the representation of the environment; and
based on receiving the input that conveys the rejection, displaying a prompt having a request for the operator to provide one or more new waypoints.

11. The method of claim 1, wherein determining the set of waypoints for review by the operator comprises:
receiving a proposed route generated by the vehicle, wherein the proposed route conveys the second path; and
determining the set of waypoints based on the proposed route generated by the vehicle.

12. A system comprising:
a vehicle; and
a computing device positioned at a remote location relative to the vehicle, wherein the computing device is configured to:
  receive location information and sensor data from the vehicle, wherein the vehicle is autonomously navigating along a first path toward a destination, and wherein the sensor data represents an environment of the vehicle;
  based on the location information and the sensor data, determine a second path that enables the vehicle to navigate around an obstacle located in the first path;
  generate a set of waypoints for review by an operator, the set of waypoints being positioned according to the second path to enable the vehicle to safely navigate around the obstacle;
  display a representation of the environment of the vehicle with at least a first waypoint and a second waypoint from the set of waypoints displayed as part of the representation of the environment, wherein the computing device is configured to generate the set of waypoints such that:
    (i) a location of the first waypoint is within a threshold distance from a first location of the vehicle received with the location information, and
    (ii) a location of the second waypoint is within the threshold distance from the location of the first waypoint; and
  provide route instructions to the vehicle based on at least the first waypoint or the second waypoint.

13. The system of claim 12, wherein the computing device is further configured to:
based on the sensor data, detect the obstacle in the first path of the vehicle; and
display the representation of the environment of the vehicle with a buffer positioned around the obstacle, wherein the computing device is configured to limit waypoints to respective positions outside the buffer.

14. The system of claim 13, wherein a radius of the buffer depends on an identification of the obstacle.

15. The system of claim 12, wherein the computing device is further configured to:
visually highlight a first area of the representation of the environment suitable for the first waypoint and visually highlight a second area of the representation of the environment suitable for the second waypoint.

16. The system of claim 15, wherein the computing device is further configured to:
visually highlight the first area using a first color and visually highlight the second area using a second color.

17. The system of claim 12, wherein the computing device is further configured to:
receive a proposed route from the vehicle; and
display the proposed route on the representation of the environment of the vehicle.

18. The system of claim 12, wherein the computing device is further configured to:
   display text requesting selection of waypoints with the representation of the environment.

19. A non-transitory computer-readable medium configured to store instructions, that when executed by a computing device comprising one or more processors, causes the computing device to perform operations comprising:
   receiving location information and sensor data from a vehicle, wherein the vehicle is autonomously navigating along a first path toward a destination, and wherein the sensor data represents an environment of the vehicle;
   based on the location information and the sensor data, determining a second path that enables the vehicle to navigate around an obstacle located in the first path;
   generating a set of waypoints for review by an operator, the set of waypoints being positioned according to the second path to enable the vehicle to safely navigate around the obstacle;
   displaying a representation of the environment of the vehicle with at least a first waypoint and a second waypoint from the set of waypoints displayed as part of the representation of the environment, wherein the set of waypoints is generated such that a location of the first waypoint is within a threshold distance from a first location of the vehicle, and a location of the second waypoint is within the threshold distance from the location of the first waypoint; and
   providing route instructions to the vehicle based on at least the first waypoint or the second waypoint.

\* \* \* \* \*